May 20, 1969     H. E. McCLURE     3,444,871
DIESEL FUEL SYSTEM
Filed May 2, 1966
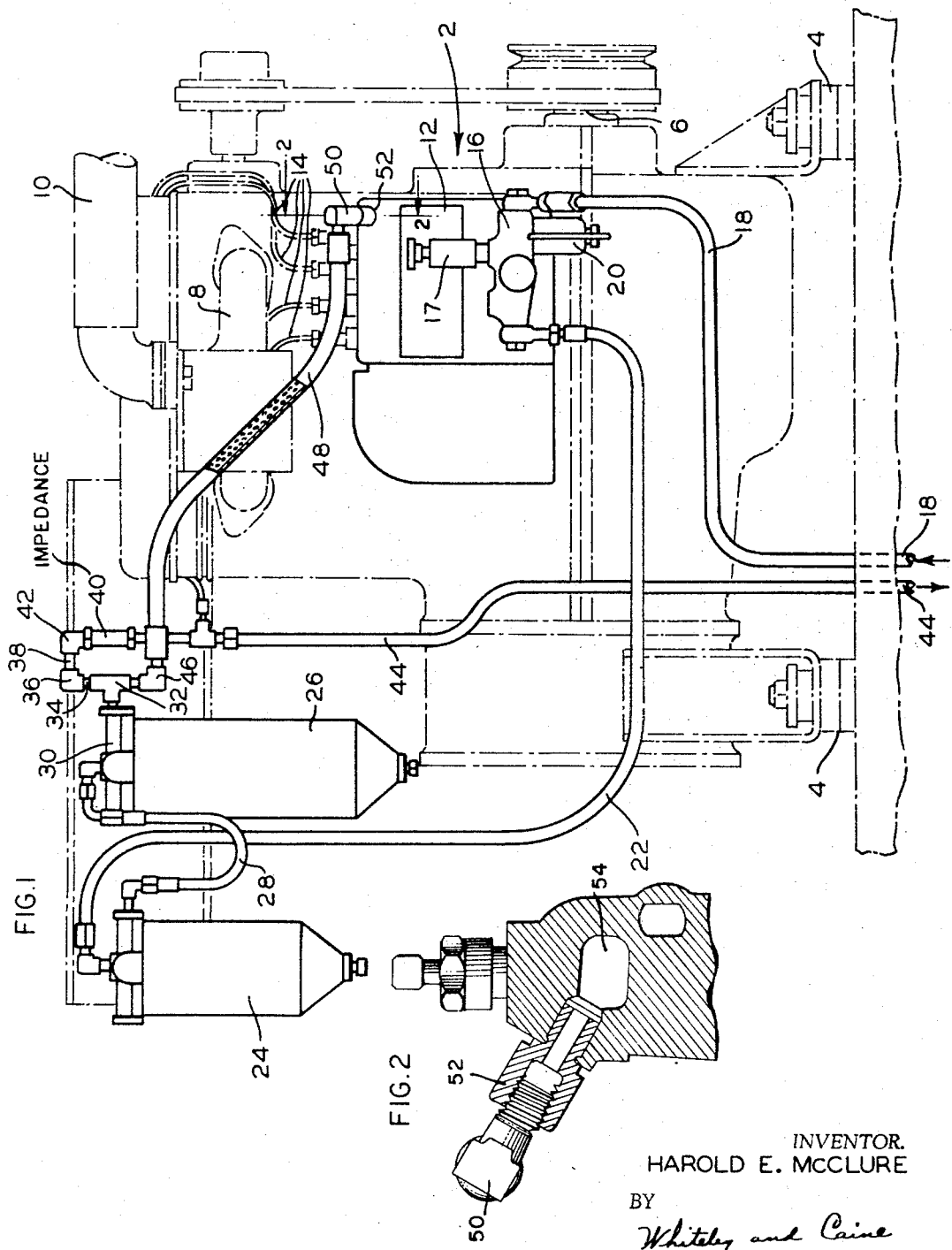
INVENTOR.
HAROLD E. McCLURE
BY
*Whiteley and Caine*
ATTORNEYS 3,444,871
DIESEL FUEL SYSTEM
Harold E. McClure, Wayzata, Minn., assignor to Thermo King Corporation, Minneapolis, Minn., a corporation of Delaware
Filed May 2, 1966, Ser. No. 546,893
Int. Cl. F02m 33/00, 37/20
U.S. Cl. 137—15                                    4 Claims

ABSTRACT OF THE DISCLOSURE

Air or other gases are removed from the injection pump of a Diesel fuel feeding system by circulating the fuel in a closed circuit with respect to the source of supply, and feeding a portion of the fuel from said circuit in a downwardly sloping path to an upper limit of the injection pump in a confined path of sufficient capacity to allow any gas to flow in an opposite or counter-current direction to a high point in the closed circuit for disposal therefrom.

---

This invention relates to a method and apparatus for removing air from a liquid fuel system. More particularly, it relates to a method and means for removing air from a Diesel fuel system, where removal is by gravitational displacement of air by fuel.

In a Diesel system, consisting of a Diesel engine, a fuel source, a delivery pump and an injection pump, it is necessary that air be removed from the injection pump to prevent its accumulation in the pump. If a sufficient amount of air accumulates within the injection pump, the level of fuel in the pump will be reduced below the point of communication with the inlet ports, and the fuel delivery will terminate, causing the engine to stop. It is necessary to remove air which may reside in the injection pump or in the fuel lines leading to the injection pump prior to starting the engine. Moreover, it is necessary to remove air which may leak into the system during operation of the engine, and which would accumulate in the injection pump and eventually cause a termination of fuel delivery to the combustion chambers.

The problem of removing air from a liquid fuel system is particularly apparent in a Diesel fuel system, where the fuel is relatively viscous, and where there is therefore the tendency for air to become entrained in the fuel system. The problem is most apparent where the engine is motive, and where it may be motive when it is not in operation. An example of such a situation occurs in the transportation industry in the use of a Diesel engine to operate a heating or cooling unit on a vehicle. Such an engine may remain inoperative while traveling over long distances, and it will therefore be subjected to jarring and vibration which tend to introduce air into the fuel lines, and this air must be removed prior to starting the engine. The tendency for air to accumulate in the fuel lines, and particularly in the portions of the system adjacent the fuel injection pump is aggravated by the positioning of the fuel source some distance below the engine, a not uncommon construction for transport heating and refrigeration units.

The removal of air from such a Diesel fuel system previously has been accomplished by two principal methods. Some Diesel fuel systems have been provided with an injection pump having one or more hand-operated vent screws which may be loosened by the operator to remove air which has accumulated in the injection pump. The disadvantages of such a means of removing air from a Diesel system are obvious; the operator must loosen the hand-operated injection pump vent screws whenever air has accumulated in the system, and this may occur each time the engine is stopped, or if air is leaking into the system during operation, frequent bleeding of air from the fuel system by the operator will be required.

A second method of removing air from such a fuel system is by the provision of a conduit which is connected to a vent hole in the upper portion of the injection pump. This conduit is then connected to a return conduit which extends back to the source of fuel, to provide a means of pumping air out of the injection pump and back to the source of fuel along with excess fuel which is returning to the source. Such a means of air removal, unlike the use of hand-operated vent screws, provides an automatic and continuous removal of air from the system; however, air removal is accomplished only during operation of the pumps. If a volume of air resides in the injection pump or in the fuel lines leading to the injection pump, the air in such a system can be removed only by pumping it out, and it will be pumped out only during operation of the engine, or by the use of a hand-operated transfer pump. In such a system, it is therefore necessary to provide a hand-operated vent screw in the upper portion of the injection pump, or to provide a hand-operated transfer pump to remove any air which was present in the injection pump prior to starting the engine and which would prevent the engine from starting. Once the engine is started, such a system will then pump air from the injection pump through the vent conduit and back to the source of fuel. In both of the previous methods of removing air from a fuel system, it may be necessary to loosen a hand-operated vent screw to bleed air from the injection pump prior to starting the engine, or to employ a hand-operated pump to pump air out of the system.

It is an object of the present invention to provide a method and means for removing air from a liquid fuel system by passing fuel to a container in association with a Diesel engine downwardly through a conduit or fuel line which has a flow capacity sufficient to permit air to flow upwardly through the conduit in countercurrent relationship to the fuel and back to the source.

Another object of the invention is to provide a method and means for removing air from a fuel system in such a manner that an engine connected to said system receives a continuous supply of fuel during operation of said engine.

Another object of the invention is to provide a method and means for removing air from an injection pump connected to a Diesel engine whereby the air is removed from the pump even when the engine is inoperative, to all times provide even when the engine is inoperative, to at all times provide a volume of fuel free from air with which to start the engine.

Another object of the invention is to provide a method and apparatus for removing air from the Diesel fuel system of a transport heating or refrigeration unit, where air is removed both while the engine is in operation and also while it is inoperative so that an engine connected to said fuel system receives a continuous supply of fuel while it is in operation, and prior to operation there is at all times a volume of fuel free from air with which to start the engine.

Another object of the invention is to provide a method and apparatus for maintaining an unbroken column of liquid fuel in communication with a receiver for said fuel, where said receiver is in association with a Diesel engine adapted to utilize said fuel.

A further object of the invention is to provide a method and means for removing air from a liquid fuel system by the gravitational displacement of air by fuel such that the air flows upwardly through a confined path in countercurrent relationship to the flow of fuel to a high point in the system, said high point being in communication with a source of the fuel, whereby an engine connected to the system receives a volume of fuel free from air for starting said engine, and after the engine is started air is then continuously pumped back to the source of fuel to prevent an interruption in the delivery of fuel to the engine cylinders.

Other and further objects of the invention may become apparent from the following specification and claims, and from the appended drawing, which illustrates an elevational view of a Diesel engine and fuel system embodying the present invention.

FIG. 1 is a general view of a diesel engine fuel system embodying the present invention. FIG. 2 is a detail on line 2—2 of FIG. 1.

Referring to FIG. 1 of the drawing, general reference numeral 2 represents a Diesel engine mounted on engine mounts 4, and having a drive shaft 6, an exhaust manifold 8, and an exhaust pipe 10 which is connected to the exhaust manifold 8. An injection pump 12 is mounted on a lateral portion of the engine 2, and a container or receiver is adapted to pump Diesel fuel through a multiplicity of injection lines 14 to each of the cylinders, not shown, of the engine 2. A fuel delivery pump 16 is mounted on a lateral portion of the fuel injection pump 12, and is driven by a cam, not shown, on the injection pump cam shaft. A hand-operated mechanism 17 is associated with the transfer pump 16 and is adapted to operate the same.

An input fuel line 18 connects a source of fuel, not shown, to the delivery 16, and a sediment bowl 20 is disposed adjacent a lower portion thereof. An output fuel line 22 is connected to the side of the fuel delivery pump 16 opposite the point of its connection to the input line 18. The output fuel line 22 extends from the delivery pump 16 to the upper portion of a primary filter 24, and the primary filter 24 is connected to a secondary filter 26 by a fuel line 28.

An output conduit 30 adjacent the upper portion of the secondary filter 26 is connected to a T-shaped coupling 32. One arm of the T-shaped coupling 32 is connected to an upwardly extending fuel line 34, which is connected by an elbow fitting 36 to a horizontal fuel line 38. The horizontal fuel line 38 is disposed at a high point in the system, and is connected to a pressure relief valve, or impedance 40 by an elbow fitting 42. The downstream side of the pressure relief valve 40 is connected to a downwardly extending return line 44 which extends back to the source of fuel.

The other arm of the T-shaped coupling 32 is connected by an elbow fitting 46 to a downwardly extending confined path or conduit 48, and the lower end of the downwardly extending conduit 48 is connected by a fitting 50 to an inlet opening 52 in the upper extremities of the injection pump 12. As shown in FIG. 2, inlet opening 52 communicates with the uppermost portion of the fuel gallery 54. The above described portions of the fuel system thus constitute a fuel circuit which is closed with respect to the source of fuel, and the confined path or conduit 48 is adapted to divert a portion of the liquid flowing through the circuit.

When the engine 2 is started, fuel is drawn from the source of fuel through the fuel line 18, through the sediment bowl 20 and through the delivery pump 16 and is delivered through the fuel line 22 to the primary filter 24. After having passed through the primary filter 24, the fuel passes through the fuel line 28 to the secondary filter 26, and is from there pumped through the outlet conduit 30 and through the T-shaped coupling 32. The fuel is then pumped from the T-shaped coupling 32 through the downwardly extending conduit 48 to the injection pump 12, which delivers fuel to the multiplicity of fuel injection lines 14, which in turn deliver fuel to each of the cylinders of the engine. After a sufficient amount of fuel has been pumped to the injection pump 12, the fuel pressure will rise to the point where excess fuel is passed through the upwardly extending fuel line 34, through the horizontal extending line 38, and through the pressure relief valve 40 to be carried back to the source of fuel through the return line 44.

If a sufficient amount of air resides in the injection pump 12 and in the injection lines 14 prior to starting the engine, the engine cylinders will receive no fuel and it will be impossible to start the engine. In the present invention, the fuel flows downwardly by gravity through the downwardly extending conduit 48 to the injection pump 12, and the air displaced by the fuel flows upwardly through the conduit 48 in countercurrent relationship to the downwardly flowing fuel to form an unbroken column of fuel in communication with the engine 2. The downwardly extending conduit 48 has a flow capacity sufficient to permit such an upward flow of air in countercurrent relationship to the flow of fuel. The air which is thus displaced flows to the upper portions of the system, and when the engine is started the air is pumped through the downwardly extending fuel return line 44 back to the source of fuel, which is vented to the atmosphere.

While the engine is running, any leaks in the system may cause air to accumulate within the injection pump 12, and if a sufficient amount of air is accumulated in the pump, the supply of fuel to the engine cylinders will be interrupted and the operatioin of the engine will cease. In the present invention the flow capacity of the conduit 48 is sufficient to permit such accumulated air to be displaced by fuel and to flow upwardly through the conduit 48 to the high point 38 in the system and from there to be pumped through the return fuel line 44 to the source of fuel to maintain an unbroken column of fuel in communication with the engine.

The present invention thus provides a system in which an adequate supply of fuel to the injection pump is insured, both while the engine is operating and also prior to operation. Air is not allowed to accumulate in the injection pump at any time. The removal of air from the fuel system is thus automatic and continuous, and does not necessitate the loosening of hand-operated vent screws or the use of a hand-operated transfer pump, except when the system is completely dry. When fuel is first introduced into the system herein described, the hand-operated mechanism 17 of the fuel delivery pump 16 must be employed to provide the initial delivery of fuel to the system, but once the system is provided with fuel, it is never necessary to use the hand-operated mechanism again unless the system is run completely dry of fuel. Given a supply of fuel in the system removal of the air is by gravitational displacement when the engine is inoperative. Once fuel has been supplied to the fuel lines and to the conduit 48, there is always a sufficient supply of fuel with which to start the engine, and once the engine is started there is a continuous removal of air.

It should be understood that the invention here disclosed is susceptible of embodiment in different forms, and that therefore, the present disclosure is to be considered as an exemplification of the principles of the invention and is not intented to limit the invention to the embodiment disclosed. The scope of the invention will be governed by the appended claims.

I claim:

1. A method of removing gas from a Diesel engine liquid fuel system, comprising the steps of pumping said liquid fuel from a source of supply through a circuit which is closed with respect to said source, diverting a portion of said liquid fuel from said circuit in a downward lateral extending confined path to an upper limiting portion of a liquid container in operative association with a Diesel engine, said confined path being of a flow capacity sufficient to maintain an unbroken column of liquid extending generally vertically above the upper limits of said container and in which gas from said container and/or carried by said liquid fuel passes upwardly therethrough as voids, and discharging said gas from said confined path into said circuit.

2. An apparatus for removing gas from a liquid fuel system, comprising a source of liquid fuel, a fuel circuit closed with respect to said source, means for pumping said fuel through said circuit, a fuel receiver, a fuel inlet connection to said receiver extending generally in a vertical direction from an upper limiting portion of said receiver, and a conduit connected to said circuit and extending laterally and downwardly in a sloping curve to said fuel inlet connection, the internal diameter of said conduit being sufficient to maintain a liquid column that extends above the upper limits of said receiver and through which any gas present in said receiver can escape upwardly into said circuit.

3. The apparatus of claim 2, wherein an impedance is disposed in said fuel circuit, and said conduit is connected to said circuit upstream from said impedance.

4. The apparatus of claim 2, wherein said fuel receiver is a fuel pump.

References Cited

UNITED STATES PATENTS

| 1,623,074 | 4/1927 | Tartrais. |
| 2,215,756 | 9/1940 | Heinrich et al. _____ 103—5 |
| 3,233,652 | 2/1966 | Phillips. |
| 3,329,194 | 7/1967 | Miliacca. |

OTHER REFERENCES

Practical Marine Diesel Engineering, Second Edition, by Louis R. Ford, 133, Printed 1931, Simmons-Boardman Publishing Co., New York, N.Y.

Publication of United American Bosch Corp., New York, N.Y., entitled, American Bosch Fuel Injection Equipment for Diesel Engines, printed in U.S.A., August 1937, p. 30-a.

FREDERICK KETTERER, *Primary Examiner.*

U.S. Cl. X.R.

123—139; 137—171, 563